(12) United States Patent
Sylvén et al.

(10) Patent No.: US 12,509,103 B2
(45) Date of Patent: Dec. 30, 2025

(54) INDICATION OF VEHICLE CHARGE STATUS

(71) Applicant: VOLVO TRUCK CORPORATION, Gothenburg (SE)

(72) Inventors: Martin Sylvén, Askim (SE); Niklas Björnemark, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 203 days.

(21) Appl. No.: 18/317,398

(22) Filed: May 15, 2023

(65) Prior Publication Data

US 2023/0373511 A1  Nov. 23, 2023

(30) Foreign Application Priority Data

May 17, 2022  (EP) .................................... 22173844

(51) Int. Cl.
*B60W 50/14* (2020.01)
*B60L 58/12* (2019.01)

(52) U.S. Cl.
CPC ............. *B60W 50/14* (2013.01); *B60L 58/12* (2019.02); *B60L 2250/16* (2013.01); *B60W 2050/146* (2013.01); *B60W 2510/244* (2013.01)

(58) Field of Classification Search
CPC .................................................... B60W 50/14
See application file for complete search history.

(56) References Cited

U.S. PATENT DOCUMENTS

| | | | |
|---|---|---|---|
| 2014/0121956 A1 | 5/2014 | Jastrzebski | |
| 2018/0079303 A1 | 3/2018 | Gromotka et al. | |
| 2019/0263275 A1* | 8/2019 | Baba | B60L 50/60 |
| 2020/0031232 A1 | 1/2020 | Enslin et al. | |
| 2020/0223319 A1 | 7/2020 | Uhlenbrock et al. | |
| 2021/0086620 A1 | 3/2021 | Li et al. | |
| 2021/0114472 A1* | 4/2021 | Stephens | B60L 53/64 |
| 2023/0192063 A1* | 6/2023 | Cronin | B60L 50/40 701/22 |

OTHER PUBLICATIONS

Extended European Search Report in corresponding European Application No. 22173844.6 dated Apr. 3, 2023 (9 pages).

* cited by examiner

*Primary Examiner* — Travis R Hunnings
(74) *Attorney, Agent, or Firm* — Jeffri A. Kaminski; Venable LLP

(57) ABSTRACT

The disclosure relates to a method for providing an indication of charge status of an electric vehicle comprising a traction motor system to a user, comprising: operating a traction motor system in an electric vehicle between an active and an inactive configuration; receiving a set of charging system values in a memory unit from the traction motor system and storing the set of charging system values in the memory unit while operating the traction motor system in the active configuration; providing the set of charging system values from the memory unit to a display unit; displaying information relating to the set of charging system values on the charge status on the display unit while operating the traction motor system in the inactive configuration. The disclosure further relates to a system for providing an indication of charge status of an electric vehicle.

14 Claims, 3 Drawing Sheets

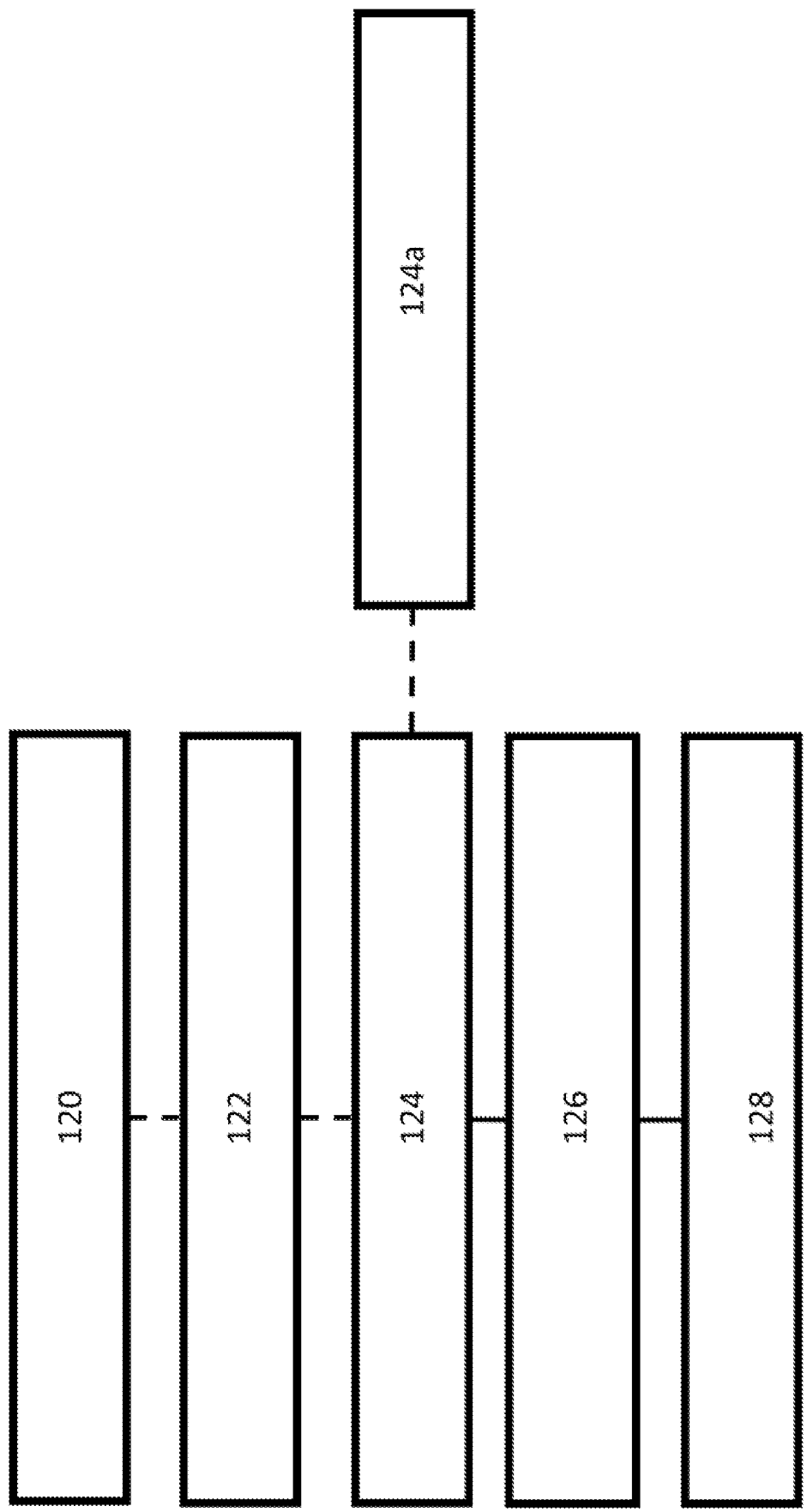

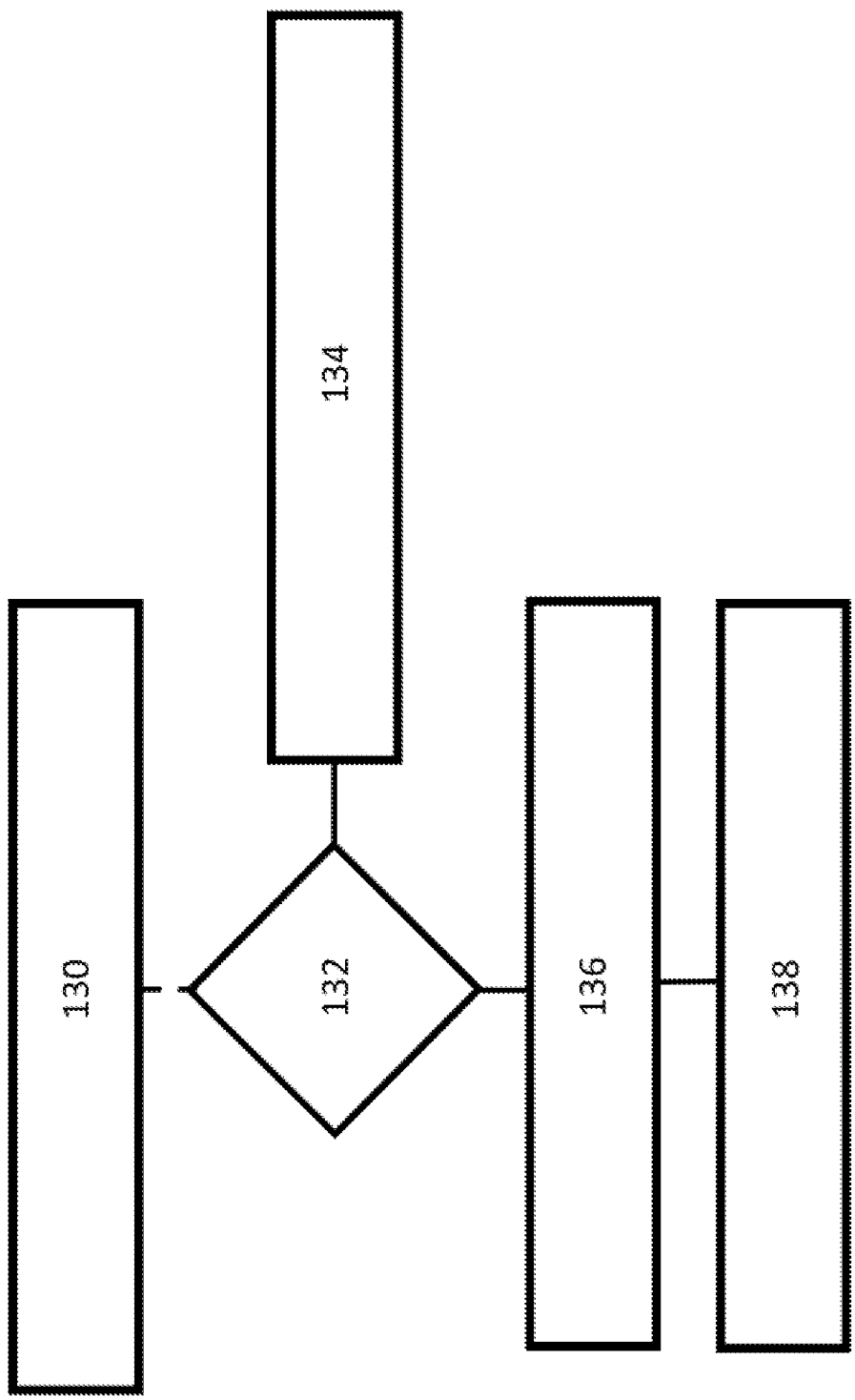

INDICATION OF VEHICLE CHARGE STATUS

TECHNICAL FIELD

The present disclosure relates to a method for providing an indication of charge status of an electric vehicle to a user and a system for providing an indication of charge status of an electric vehicle.

BACKGROUND ART

In recent years, society is becoming increasingly aware of the need to reduce reliance on fossil fuels. Global power generation is steadily moving away from hydrocarbon energy generation technology, and towards more environmentally friendly methods of generating power, such as via wind turbines, solar panels, etc.

This mindset similarly applies in the transport industry, where there is an increasing push to provide vehicles that can be powered by sources other than petrol. In particular, the use of electric vehicles is becoming increasingly popular. In recent years, advances in electric vehicle technology has meant that such vehicles have more powerful batteries, and are able to run more efficiently. These advancements have also brought down the cost of many electric vehicles, and have increased the range that an electric vehicle can travel on a single charge, further increasing the popularity of electric vehicles, as well as making them a viable alternative to traditional petrol or diesel powered vehicles. At the same time, rising costs of traditional fuels is pushing many consumers away from the use of petrol and diesel powered vehicles.

In contrast to a petrol or diesel powered vehicle, which can with a relatively simple mechanical arrangement display to a user the present level of fuel in a fuel tank, electrical vehicles must use a processing unit to read or check the state of charge of a battery in a vehicle, and then show this to a user on a display. There may also be other factors to consider which do not have much or any relevance to the filling of a standard vehicle with petrol, such as determining and/or confirming the connection status of a vehicle to a power source, providing a user with the current charging status of a vehicle, or the like.

During driving, the state of charge of a vehicle may be read in a relatively straightforward manner as the traction motor system containing the battery may be powered on and regular readings of the state of charge may be available. However, in cases where the traction motor system is powered off, achieving a reading of state of charge or characteristics of the charging system (e.g. the system comprising the traction battery and associated charging equipment) may be more problematic.

Having access to information regarding charging status, connection status, state of charge etc. is important for a user of an electric vehicle. Especially in a commercial vehicle, this information impacts the daily operation thereof. Having access to up-to-date information regardless of whether the traction motor system is awake or not is therefore important, and it also helps to give a user a premium feeling which can inspire confidence in the vehicle they are driving.

A known practice for solving such problems is either to power on the traction motor system when information is required, or to keep the traction motor system powered on at all times. Although this may lead to the desired information being available, this costs energy and hence will impact the range of the vehicle and the cost of operation to a user, and where the traction motor system must be powered on which information is required, the system may appear sluggish to a user.

SUMMARY

It is an object of the present disclosure to mitigate, alleviate or eliminate one or more of the above-identified deficiencies and disadvantages in the prior art and solve at least the above mentioned problem. According to a first aspect there is provided a method for providing an indication of charge status of an electric vehicle comprising a traction motor system to a user, comprising: operating a traction motor system in an electric vehicle between an active and an inactive configuration; receiving operational data from the traction motor system in a processing unit to provide a set of charging system values; storing the set of charging system values in a memory unit while operating the traction motor system in the active configuration; providing the set of charging system values from the memory unit to a display unit; displaying information relating to the set of charging system values on the charge status on the display unit while operating the traction motor system in the inactive configuration.

In use, the memory unit may receive a set of charging system values from the traction motor system while the traction motor system is in the active configuration. The set of charging system values may then be stored in the memory unit, and may be provided to the display unit for displaying to user. The set of charging system values may then be displayed to a user with the traction motor system in both the active and inactive configuration. As such, a user may have access to the set of charging system values regardless of whether the traction motor system is in the active or the inactive configuration, without having to power up the traction motor system, and without the requirement that values can only be provided on the display unit when the traction motor system is in the active configuration.

According to some embodiments, the method comprises displaying the information relating to the charge status on the display unit while operating the traction motor system in the active configuration. As such, information relating to the charge status is able to be displayed regardless of whether the traction motor system is in the active or the inactive configuration.

According to some embodiments, the method comprises receiving or reading operational data to provide a plurality of sets of charging system values, each set with a corresponding time value, and displaying information relating to the set of charging system values having the most recent corresponding time value on the display unit. The user will therefore be provided with the data that relates to the most recently received set of charging system values, and will relate to the most up-to-date information in the memory unit.

According to some embodiments, the method comprises receiving or reading operational data to provide each of the plurality of sets of charging system values sequentially, each of the plurality of sets of charging values being separated from at least one of a previous and a subsequent set of charging values by a time interval. According to some embodiments, at least two of the time intervals are the same.

The processing unit, or processor, may be configured to read operational data from a sensor arrangement at predetermined time intervals, and thereby provide a set of plurality of sets of charging system values corresponding to each of the time intervals in a predictable way, that enables the sets of charging system values to be updated regularly to provide the user with constantly up-to-date information.

According to some embodiments, the method comprises sending a request for a set of charging system values from the display unit to the memory unit. A user may be therefore enabled to request up-to-date information from the memory unit when desired.

According to some embodiments, the method comprises providing the traction motor system in a high voltage electrical system, and the memory unit and the display unit in a low voltage electrical system. According to some embodiments, the high voltage electrical system is powered by a primary vehicle battery and the low voltage electrical system is powered by an ancillary vehicle battery.

In doing so, the memory unit and display unit may be able to be powered, used and provide information at times when the high voltage electrical system is powered down, without having to power the high voltage electrical system to access information in the memory unit.

According to some embodiments, the memory unit is, or is comprised within, at least one of a telematics unit and the display unit. Having the memory unit be or form part of another unit may greatly simplify the setup and installation of the components necessary to perform the method.

According to some embodiments, the memory unit comprises a cache memory, which may provide quick and convenient access to the set of charging system values.

According to some embodiments, the set of charging system values comprises at least one of: charging status, connection status and state of charge. According to some embodiments, the set of charging system values comprises all of: charging status, connection status and state of charge. Such a set of charging system values may therefore be used to provide a user with a wide range of information, from the vehicle state of charge, to the state of the electrical connection to the vehicle.

According to some embodiments, the method comprises providing the set of charging system values to a cloud based storage, which may be helpful for providing a backup and access to information remotely from a vehicle.

According to a second aspect there is provided a system for providing an indication of charge status of an electric vehicle, comprising: a display unit for mounting in an electric vehicle; a vehicle traction motor system configurable between an active configuration and an inactive configuration, and comprising a data output for outputting a set of charging system values therefrom; a memory unit for receiving a set of charging system values from the data output of a traction motor system of an electric vehicle, and configurable to store a set of charging values therein and comprising a display data connection to the display unit for providing the set of charging system values to the display unit; wherein the display unit is configured to display information relating to a set of charging system values when the traction motor system is in the inactive configuration.

Effects and features of the second aspect are to a large extent analogous to those described above in connection with the first aspect. Embodiments mentioned in relation to the first aspect are largely compatible with the second aspect.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIG. 2 shows a flow chart of steps involved in the process of displaying relevant information on a display unit.

FIG. 3 is an example of a process whereby a user requests charge status information.

DETAILED DESCRIPTION

Figure 1:
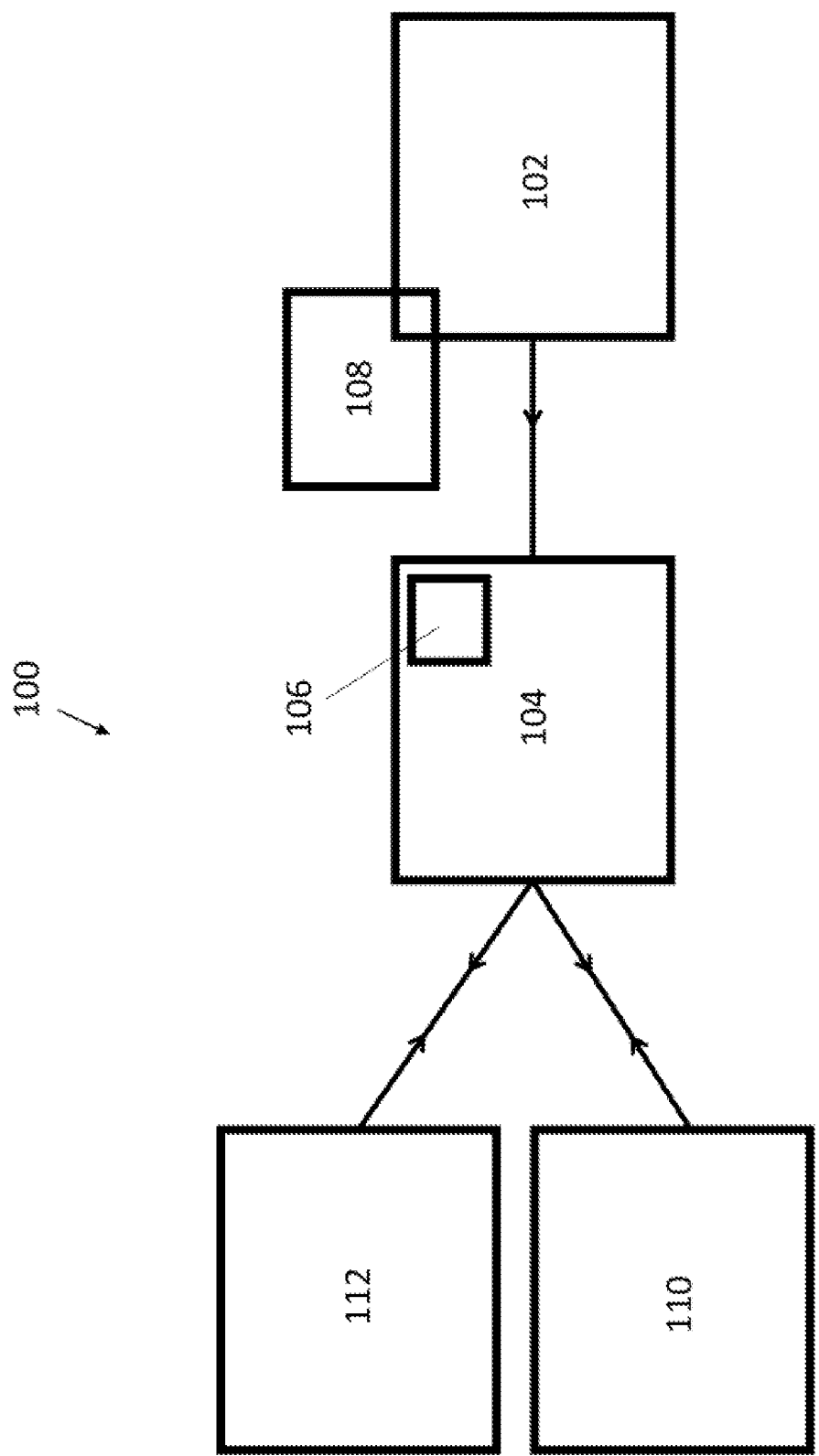
FIG. 1 is a block diagram illustrating data transfer in an electric vehicle.

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

The first aspect of this disclosure shows a method for providing an indication of charge status of an electric vehicle (e.g. an electric vehicle comprising a traction motor system) to a user, comprising: operating the traction motor system in an electric vehicle between an active and an inactive configuration; receiving operational data from the traction motor system in a processing unit to provide a set of charging system values; storing the set of charging system values in a memory unit while operating the traction motor system in the active configuration; providing the set of charging system values from the memory unit to a display unit; displaying information relating to the set of charging system values on the display unit while operating the traction motor system in the inactive configuration.

FIG. 1 shows a block diagram 100 illustrating data transfer in a vehicle. In particular, the vehicle is an electric vehicle comprising a traction motor system 102. The traction motor system 102 may comprise for example a traction motor and a traction battery. The traction motor system 102 may also comprise an inverter for converting the DC of the battery to AC and a reducer (e.g. a gear arrangement) to vary the speed and torque transmitted from the traction motor to the wheels of the car.

Also illustrated in FIG. 1 is a memory unit 104. The memory unit 104 may be or comprise a memory storage device that is capable of storing information received from the traction motor system 102, for example a cache memory storage. In this case, the memory unit 104 is configured to store a set of charging system values received from the traction motor system 102, or from a processing unit that has received data from the traction motor system 102.

The method may comprise receiving the set of charging system values in the memory unit 104 in any appropriate way or form. For example, the charging system values may be measured in a variety of different ways, and may therefore differ depending on the way in which the charging system values are measured.

The traction motor system 102 may comprise a sensor arrangement 108 configured to collect and provide information to the memory unit 104. The provided information from the sensor arrangement 108 may be considered operational data. The sensor arrangement 108 may be configured to provide the operational data to a processor 106, or the processor 106 may be configured to read operational information from the sensor arrangement 108, which may then provide information (e.g. one or a plurality of calculated charging system values, a set of charging system values) to the memory unit 104.

The set of charge status values may be used to provide an indication of the charge status of an electric vehicle. An indication of the charge status of an electric vehicle may be provided by any information relating to the function of the traction battery or any necessary equipment for charging the battery. For example, the charging status of the electric vehicle, the state of charge of the electric vehicle, the charging rate, connection status to a charger, or the like. The charge status values may be displayed on the display unit 110, or converted to user-understandable information and displayed on the display unit 110, to provide an indication of the charge status of the electric vehicle.

The sensor arrangement 108 may be configured to provide operational data to the memory unit 104 that relates to the state of charge of the traction motor system 102 for example a battery in the traction motor system 102.

A set of charging system values may be measured and/or calculated based on the input and/or output of a battery in the traction motor system 102, and/or based on the output of the sensor arrangement 108. This set of charging and power system values may be representative of the state of charge of the battery in the traction motor system 102.

The set of charging system values may comprise a single charging system value, or a plurality of charging system values.

For example, a charging system value, or a plurality of charging system values, may be measured or calculated at least partially based on the voltage output of the traction battery in the traction motor system 102. In such cases, the traction motor system 102 may comprise a sensor arrangement 108 comprising at least one voltage sensor, configured to measure voltage output from the traction battery of the traction motor system 102. The value of the voltage output from the traction battery may be a charging system value. Alternatively or additionally, analysis (e.g. a calculation, a comparison with known or previously recorded values, or the like) may be performed on the voltage output from the traction battery to provide a charging system value or a plurality of values. For example, the voltage output may be compared against output voltage curves that may be specific to the traction battery in order to provide information on the state of charge of the traction battery, such as a value that represents the state of charge of the traction battery. Information on the output voltage curves may be stored in a storage device located in the traction motor system 102 or the memory unit 104. The analysis (e.g. the comparison and/or any necessary calculations or conversions) may be performed by a processor 106. The processor 106 may be located, for example, in the traction motor system 102 or in the memory unit 104. In the example of FIG. 1, the processor 106 is located in, and may form part of, the memory unit 104.

In another example, the charging system values may be measured at least partially based on the current output of, and optionally current input to, the traction battery. In such cases, the traction motor system 102 may comprise a sensor arrangement comprising at least one current sensor, configured to measure current output from the traction battery of the traction motor system 102, and optionally at least a second current sensor in order to measure the current that flows into the traction battery. The value of the current output, and optionally the value of the current input, from/to the traction battery may be a charging system value or values, or may be used to calculate a charging system value or values. Alternatively or additionally, analysis may be performed on the current output from and/or current input to the traction battery to provide a charging system value or a plurality of values. For example, the current output may be integrated over time to find the number of coulombs of electrical charge that have flowed out of the battery and may compare this to the number of coulombs of electrical charge that are known to have flowed into the battery in order to provide a value that is representative of the state of charge of the battery. The analysis may be performed by the processor 106. The processor 106 may be, for example, located in the traction motor system 102 or in the memory unit 104 as previously described.

The state of charge of the battery may be a charging system value. The information on the state of charge of the battery provided by the above-described voltage comparison, or current input/output comparison, may relate to the current level of charge of the battery and in some examples may be expressed as a fraction or percentage of the level of charge of the battery when fully charged. The charging system value of state of charge may therefore be expressed as a number which is a percentage or fraction of a fully charged battery, and may therefore be a number between 0 and 1, between 0 and 100, or the like.

In yet another example, a combined approach may be used, in which a number of methods are combined in order to provide a charging system value or charging system values. For example, both current and voltage may be measured as described above, and an average or weighted average of values produced by an analysis of the current and voltage values to provide a charging system value or values.

In some examples, a Kalman filtering approach may be used to assist in the calculation of a charging system value, such as state of charge value of the traction battery.

The processor 106 may be configured to calculate a charging system value based on operational data received from the sensor arrangement 108. The processor 106 may be configured to send and store a calculated charging system value in the memory unit 104, e.g. in a storage device located in the memory unit 104 such as a cache memory storage device. The processor 106 may be configured to transmit a charging system value (e.g. a calculated charging system value) to the storage device, and the storage device may be configured to receive a charging system value from the processor 106.

The sensor arrangement may be configured to provide operational data relating to the charge status of the traction motor system 102.

For example, a charging system value, or a plurality of charging system values, may be measured or calculated at least partially based on the power input to the traction battery in the traction motor system 102. In such cases, the traction motor system 102 the sensor arrangement 108 may be configured to measure the power input, for example comprising at least one voltage sensor and/or at least one current sensor, configured to measure voltage and/or current input to the traction battery of the traction motor system 102. The value of the power input, or the voltage input, or the current input to the traction battery may be a charging system value, or may be used to calculate a charging system value.

The charging status of the traction motor system 102, for example the traction battery in the traction motor system 102, may be measured or calculated based on the power input to the traction battery. Analysis may be performed on the power input measured by the sensor arrangement 108 to calculate the charging status. The charging status may be described in binary terms, and therefore this charging system value may be either 0 or 1, where 0 may correspond to the charging status being "not charging" while 1 may correspond to the charging status being "charging". The analysis performed on the power input to calculate the charging system value may consider whether the power input is a zero value or a non-zero value. Where the power input is a zero value, then then charging system value may be 0, and were non-zero the value may be 1. Further, the analysis may involve considering a threshold value of power input above which the power input is considered to have a non-zero value, and below which the power input is considered to have a zero value. For example, power inputs below a level that would be insufficient to charge the traction battery, or to provide a full charge to the traction battery within a desired timeframe (e.g. 1 day, 1 hour, 30 minutes, or the like) may be considered to be zero values. The analysis may be performed by the processor 106.

Power input to the traction battery may be provided from a charger that is connected to a charging port of the battery, or may be provided by alternative means, such as from a kinetic energy recovery system (KERS) that is present in the traction motor system 102, or from a power generation means that is present on the vehicle containing the traction motor system 102, such as a solar panel, a generator (e.g. a petrol powered generator) or the like.

The sensor arrangement 108 may be configured to provide operational data relating to the connection status of the traction motor system 102, such as the connection status of the traction battery to a power source.

A charging system value, or a plurality of charging system values may be measured or calculated based on an indication of whether the traction motor system 102 is connected to a power source, and optionally the quality of the connection. In such cases, the sensor arrangement may comprise a sensor located at or in the charging port of an electrical vehicle, such as at least one or a combination of a pressure sensor, an optical sensor, or any appropriate sensor that is able to identify whether a physical charging cable or connector is connected to the charging port. Optionally, the sensor arrangement may comprise a moisture sensor which may be used to calculate whether a power connector or connection port comprises moisture therein, which may also affect the quality of the connection. Further, the quality of the connection may also be measured by taking a measure of the voltage or current at the input to a battery, and for example measuring this value relative to an expected value to give an idea of the quality of connection, which may be weaker than expected, intermittent, or the like, thereby indicating a poor quality connection to power. Analysis may be performed on the operational data provided from the sensor arrangement (e.g. from the pressure sensor, optical sensor, voltage sensor, current sensor, or the like) to provide a charging system value that relates to the connection status. For example, a binary charging system value may be provided, where 0 is "no charger connected" and 1 is "charger connected". Other relevant charging system values may be a binary value indicative of whether moisture is detected, or a value between 0 and 1 (which may or may not be a binary value) indicative of the quality of the electrical connection. E.g. does the electrical connection provide the expected voltage and/or current, is the electrical connection stable or intermittent, or the like.

Other examples of charging system values that may be measured may be a value representing whether the charging port is locked or open (e.g. data may be provided via the sensor arrangement 108, such as via a pressure or optical sensor), a value representing the charging equipment status, such as whether the charge cord is locked to the vehicle or unlocked, or if there is an error preventing the information being obtained, or with the locking mechanism. Charging system values relating to the charging speed, the remaining energy (in kWh) in the battery and an estimation of the remaining range of an electric vehicle in which the traction motor system 102 is located, may also be calculated and stored in the memory unit, for example by measuring voltage and/or current output from the traction battery 104 as described above.

The processor 106 may be configured to continually receive data from the sensor arrangement, and/or the sensor arrangement may be configured to continually provide data to the processor 106.

The processor 106 may be configured to receive operational data from the sensor arrangement corresponding to parameters relating to the traction battery output. The sensor arrangement may comprise a battery output sensor or plurality of sensors that are configured to measure at least one output parameter (e.g. of output voltage and/or output current) that is being output by the traction battery (e.g. from the traction battery to the traction motor), and the processor may be configured to receive data from the battery output sensors.

For example, the processor may be configured to continually receive data from the sensor arrangement when the traction motor system is in the active configuration. In the active configuration, the traction battery may have a non-zero output, for example a non-zero output to the traction motor. As such, in the active configuration the traction motor system may comprise a traction battery providing power to a traction motor, so as to drive the traction motor. Where the traction motor system is in the active configuration, the processor 106 may receive operational data comprising non-zero values corresponding to the parameters that are being measured by the sensor arrangement, for example non-zero values corresponding to parameters relating to traction battery output, such as output voltage and/or output current. For example, where the sensor arrangement is configured to measure output voltage, the traction battery output voltage being measured may be a non-zero value.

The processor 106 may be configured to receive operational data (e.g. continually receive data) from the sensor arrangement corresponding to parameters relating to the traction battery input. The sensor arrangement may comprise a battery input sensor or plurality of sensors that are configured to measure at least one input parameter (e.g. of input voltage and/or input current) that is being input to the traction battery, and the processor 106 may be configured to receive data from the battery input sensors. The traction motor system 102 may comprise a charging configuration. The charging configuration may correspond to a configuration in which at least one input parameter to the traction battery is non-zero, for example where one or both of the voltage and/or current input to the traction battery is non-zero.

The processor 106 may be configured to recognise a configuration of the traction motor system 102. For example, where the sensor arrangement comprises an output sensor or plurality of output sensors measuring output of the traction battery, the processor may be able to identify whether the operational data (e.g. the output values) from the traction battery are zero values or non-zero values. Where the output values are non-zero values, then the processer may be able to recognise that the configuration of the traction motor system is active, as the traction battery is providing power to the traction motor, for example to drive the traction motor. Where the output values are zero values, then the processor may be able to recognise that the configuration of the traction motor system is inactive, as the traction battery is not providing power to the traction motor. In some examples, the processor may be able to consider small input and/or output values as zero values, for the purposes of identifying the configuration of the motor. For example the processor may be configured to consider input and/or output values below a predetermined threshold value to be a zero value, or equivalent to a zero value. The processor 106 may be able to consider small input and/or output values as zero values, when the small input and/or output value persists for a predetermined length of time, for example 0.5 seconds, 1 second, or the like. In this way, the processor may be able to identify the traction motor system as being in the inactive configuration even when small readings may be registered by the sensor arrangement, which may be as a result of sensor errors or anomalous small voltages and currents that may be flowing in the traction motor system 102.

The configuration (e.g. the active configuration, the inactive configuration and the charging configuration) of the traction motor system 102 may be a charging system value, or may be represented by a charging system value, which may be stored in the memory unit 104.

The method may comprise configuring the processor 106 to determine the configuration of the traction motor system 102 continuously. For example the method may comprise configuring the processor 106 to determine the configuration of the traction motor system 102 at regular time intervals, or after a predetermined time interval. In some examples, the processor may be configured to determine the configuration of the traction motor system 102 every second, or every fraction of a second, such as every 0.5 seconds, 0.2 seconds, 0.1 seconds or the like. The time intervals may be regular (e.g. uniform in length) or in some cases it may also be possible that the time intervals are irregular.

The method may comprise storing a set of charging system values in the memory unit 104 (e.g. a storage device in the memory unit 104) when the processor determines or recognises the traction motor system 102 to be in the active configuration. For example, the charging system values relating to the state of charge of the traction battery, the charging status and the state of charge may be stored in the memory unit 104 when the traction motor system 102 is in the active configuration, and may be measured or calculated as previously described.

The method may comprise only storing a set of charging system values in the memory unit 104 when the processor determines or recognises the traction motor system 102 to be in the active configuration. For example, when the processor 106 determines that the traction motor system 102 is in the inactive configuration, the processor may not calculate the charging system values, or the other charging system values (in the case where the traction motor system configuration is also considered a charging system value).

The method may comprise replacing a previously measured and/or calculated charging system value, or set of charging system values, with a more recently measured or calculated charging system value or set of charging system values, such as replacing a or each charging system value with a more recent charging system value of the same type. As such, a charging system value representative of the state of charge of a traction battery may be replaced by a more recently calculated charging system value representative of the traction battery state of charge. The method may comprise storing only one charging system value of each type (e.g. state of charge, charging status, connection status, traction motor configuration, or the like).

The method may comprise providing the display unit 110 with the set of charging system values stored in the memory unit 104. For example, the method may comprise providing the display unit with the most recently stored set of charging system values, for example the most recently stored of each type of charging system values (the most recently stored state of charge, charging status, connection status, moisture detection, etc. charging system value).

The method may comprise providing the display unit 110 with the set of charging system values when the traction motor system 102 is in the active configuration, in the inactive configuration or both when the traction motor system 102 is in the active and inactive configurations.

The method may comprise providing the display unit 110 with a charging system value or set of charging system values from the memory unit 104 in response to a prompt from a user. For example in response to a user powering the display unit on, or requesting a refresh of the display on the display unit 110. The method may comprise providing the display unit 110 with a charging system value set of charging system values from the memory unit 104 at regular time intervals, or after a regular time interval. For example, the method may comprise providing the display unit with a charging system value or set of values every second, every 5 seconds, every 10 seconds, every minute, or the like.

The method may comprise providing a back-end system 112 with a charging system value or a set of charging system values, in a similar way as the values may be provided to the display unit. The back end system may be, for example, a cloud storage and/or mobile app. As such, a user may be able to request information relating to the charging system values without being near the traction motor system 102 (e.g. without being located in a vehicle equipped with the traction motor system 102).

The method may comprise displaying the charging system values to a user in any appropriate way. For example, the method may comprise displaying the charging system values in a selected language (e.g. is the battery charging or not? Is the charger connected? What is the state of charge of the traction battery as a percentage of a full charge, or the like).

The method may comprise providing power to operate at least one of, multiple of, or all of, the memory unit 104, the processor 106 and the display unit 110. The power may be provided by a secondary battery, such as an ancillary battery. The secondary battery may be located in a vehicle with the traction motor system 102. The ancillary battery may provide a low voltage electrical system, while the traction battery may provide a high voltage traction system.

FIG. 2 illustrates some steps involved in the method of providing an indication of charge status to a user. In the first step 120, the traction motor system 102 outputs operational data, for example via a sensor arrangement 108 which is configured to measure operational data in the traction motor system 102, and output this data. In step 122, the output from the traction motor system 102 is processed by a processor 106, which may happen at regular time intervals as previously described, to provide a charging system value or a set of charging system values.

In step 124, the memory unit stores the set of charging values from the processor 106. Where the processor is located in the traction motor system 102, the memory unit 104 also receives the set of charging values. In some cases, the processor 106 may be located in the memory unit 104, in which case the memory unit 104 receives the operational data, and the charging system values may both be calculated and stored in the memory unit 104. The memory unit 104 stores the set of charging values in a memory storage device therein. In some examples, as is illustrated in step 124a, the memory unit 104 may delete a previously stored charging system value, or some or all of the previously stored charging system values, in order for them to be replaced with new, more recently recorded charging system values.

Steps 120-124 (including step 124a) may be performed only in the situation where the traction motor system 102 is in the active configuration.

In step 126 the display unit 110 receives the set of charging values that are currently stored in the memory unit, e.g. the most recent set of charging system values that are stored in the memory unit 104. In order to distinguish the charging system values, or sets of charging system values, from others of the same time, each charging system value may be assigned a time value indicative of the time in which the operational data used to calculate the value was output from the traction motor system 102. The processor 106 may be able to use this time value to identify the most recent of each type of charging system value.

Finally, in step 128, the display unit displays each of the charging system values to a user to provide an indication of the charge status of the electric vehicle. The charging system values may be displayed in a way that is easily understandable by a user, using simple text, percentage values, graphical data (e.g. a graphical progression of state of charge over time).

In FIG. 3, there is illustrated an example of a process through which a user is notified of information relating to the charge status of the traction motor system 102.

The process may be started at step 130, which may represent a prompt to provide information on the display unit 110, for example in the form of a request to the memory unit 104 to provide a set of charging system values. This may be a prompt to the processor 106 to determine whether the traction motor system 102 is in the active or inactive configuration. Step 130 may be prompted after a predetermined period of inactivity of the processor, where the processor is configured to determine the configuration of the traction motor system 102 at a predetermined time interval, or a plurality of predetermined time intervals, or may be prompted by a user, for example by a request for information from a user, either on the display or through a back-end system such as an app.

Once prompted, the processor may determine whether the traction motor system 102 is in the active or inactive configuration in step 132, and then may either move to step 134 where the inactive configuration is determined, or to step 136 where the active configuration is determined.

Where the inactive configuration is determined, step 134 may represent the display unit 110 receiving the most recently stored set of charging system values that is stored in the memory unit.

Where the active configuration is determined, step 136 may represent the receiving of operational data by the processor 106, and the subsequent calculation of a set of charging system values and storage in the memory unit 104.

Finally, step 138 may represent the display unit 110 receiving the set of charging system values from the memory unit 104 that were shortly before calculated by the processor 106 and stored in the memory unit 104.

This process may permit a user to always be able to receive information on the charge status of a vehicle, regardless of whether the traction control unit 102 is in the active or inactive configuration, and may therefore provide a user with accurate information without having to power the traction motor system 102 (either continually or on request), which may be costly in terms of energy usage, and may be slow to respond if the request is made when the system 102 is in the inactive configuration.

The second aspect of this disclosure shows a system for providing an indication of charge status of an electric vehicle, comprising: a display unit for mounting in an electric vehicle; a vehicle traction motor system configurable between an active configuration and an inactive configuration, and comprising a data output for outputting a set of charging system values therefrom; a memory unit for receiving a set of charging system values from the data output of a traction motor system of an electric vehicle, and configurable to store a set of charging values therein and comprising a display data connection to the display unit for providing the set of charging system values to the display unit; wherein the display unit is configured to display information relating to a set of charging system values when the traction motor system is in the inactive configuration.

In some examples, the memory unit may be located within the display unit in the described system. In other examples, the memory unit may be in the form of a telematics unit.

The system may comprise a traction battery located in the vehicle traction motor system. The system may also comprise an ancillary battery, which may be provided external to the vehicle traction motor system.

The system may comprise a high voltage and a low voltage electrical system. For example, the system may comprise a traction battery that powers the high voltage electrical system, and an ancillary battery which powers the low voltage electrical system. At least one of, a plurality of, or all of, the sensor arrangement 108, the processor 106, the memory unit 104 and the display unit 110 may be powered by the low voltage electrical system, whereas the traction motor may be powered by the high voltage electrical system.

The person skilled in the art realises that the present disclosure is not limited to the preferred embodiments described above. The person skilled in the art further realises that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A method for providing an indication of charge status of an electric vehicle comprising a traction motor system to a user, comprising:
operating a traction motor system in an electric vehicle between an active and an inactive configuration;

receiving or reading operational data from the traction motor system in a processing unit to provide a plurality of sets of charging system values, each set with a corresponding time value;

storing the sets of charging system values in a memory unit while operating the traction motor system in the active configuration;

providing the sets of charging system values from the memory unit to a display unit;

displaying information relating to the sets of charging system values having the most recent corresponding time value on the display unit, while operating the traction motor system in the inactive configuration, to provide a user an indication of the charge status of an electric vehicle.

2. The method of claim 1, comprising displaying the information relating to the charge status on the display unit while operating the traction motor system in the active configuration.

3. The method of claim 1, comprising receiving or reading operational data from the traction motor system to provide each of the plurality of sets of charging values sequentially, each of the plurality of sets of charging values being separated from at least one of a previous and a subsequent set of charging values by a time interval.

4. The method of claim 3, wherein at least two of the time intervals are the same.

5. The method of claim 1, comprising sending a request for a set of charging system values from the display unit to the memory unit.

6. The method of claim 1, comprising providing the traction motor system in a high voltage electrical system, and the memory unit and the display unit in a low voltage electrical system.

7. The method of claim 6, wherein the high voltage electrical system is powered by a primary vehicle battery and the low voltage electrical system is powered by an ancillary vehicle battery.

8. The method of claim 1, wherein the memory unit is at least one of a telematics unit and the display unit.

9. The method of claim 1, wherein the memory unit comprises a cache memory.

10. The method of claim 1, wherein the set of charging system values comprises at least one of: charging status, connection status and state of charge.

11. The method of claim 1, wherein the set of charging system values comprises all of: charging status, connection status and state of charge.

12. The method of claim 1, comprising providing the set of charging system values to a cloud based storage.

13. The method of claim 1, comprising collecting the operational data via a sensor arrangement.

14. A system for providing an indication of charge status of an electric vehicle, comprising:
 a display unit for mounting in an electric vehicle;
 a vehicle traction motor system configurable between an active configuration and an inactive configuration, and comprising a data output for outputting a plurality of sets of charging system values, each set with a corresponding time value therefrom;
 a memory unit for receiving sets of charging system values from the data output of the traction motor system of an electric vehicle, and configurable to store the sets of charging values therein and comprising a display data connection to the display unit for providing the sets of charging system values to the display unit;
 wherein the display unit is configured to display information relating to the sets of charging system values having the most recent corresponding time value when the traction motor system is in the inactive configuration.

* * * * *